(12) United States Patent  
Suzuki

(10) Patent No.: US 9,747,496 B2
(45) Date of Patent: Aug. 29, 2017

(54) IMAGE PROCESSING DEVICE, METHOD FOR PROCESSING IMAGE

(71) Applicant: FUJITSU LIMITED, Kawasaki-shi, Kanagawa (JP)

(72) Inventor: Genta Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 808 days.

(21) Appl. No.: 14/103,118

(22) Filed: Dec. 11, 2013

(65) Prior Publication Data

US 2014/0205157 A1 Jul. 24, 2014

(30) Foreign Application Priority Data

Jan. 24, 2013 (JP) .................................. 2013-010959

(51) Int. Cl.
*G06K 9/00* (2006.01)
*G06K 9/46* (2006.01)
*G06K 9/62* (2006.01)

(52) U.S. Cl.
CPC ....... *G06K 9/00362* (2013.01); *G06K 9/4642* (2013.01); *G06K 9/6212* (2013.01)

(58) Field of Classification Search
None
See application file for complete search history.

(56) References Cited

U.S. PATENT DOCUMENTS

2007/0047775 A1* 3/2007 Okubo ............... G06K 9/00248
382/118

2007/0098231 A1* 5/2007 Minato ............... G06K 9/00281
382/118

(Continued)

FOREIGN PATENT DOCUMENTS

JP 2007-65766 3/2007
JP 2007-128262 5/2007

(Continued)

OTHER PUBLICATIONS

"*Keystroke dynamics as a biometric for authentication*", Fabian Monrose, Aviel D. Rubin; Courant Institute of Mathematical Science, New York University, New York, NY, USA, AT&T Labs—Research, Florham Park, NJ, USA; Future Generation Computer Systems 16 (2000) 351-359.

(Continued)

*Primary Examiner* — Delomia L Gilliard
(74) *Attorney, Agent, or Firm* — Staas & Halsey LLP

(57) ABSTRACT

An image processing device includes a processor; and a memory which stores a plurality of instructions, which when executed by the processor, cause the processor to execute: obtaining a first image and a second image; determining a first direction of a certain first reference point of a first region of a user included in the first image and a second direction of a certain second reference point of a second region of the user included in the second image; extracting a first feature quantity from the first region and a second feature quantity from the second region; generating a third feature quantity from the first feature quantity or a fourth feature quantity from the second feature quantity on the basis of the first direction or the second direction; and authenticating the user on the basis of similarity between the first feature quantity or the third feature quantity.

9 Claims, 18 Drawing Sheets

(56) References Cited

U.S. PATENT DOCUMENTS

| | | | | |
|---|---|---|---|---|
| 2009/0196467 A1* | 8/2009 | Okubo | ............... | G06K 9/00288 |
| | | | | 382/118 |
| 2009/0273687 A1* | 11/2009 | Tsukizawa | .............. | G06F 3/012 |
| | | | | 348/222.1 |
| 2014/0163424 A1* | 6/2014 | Kawaguchi | .......... | A61B 5/0077 |
| | | | | 600/595 |
| 2015/0234881 A1* | 8/2015 | Hirata | ............... | G06F 17/30348 |
| | | | | 707/609 |

FOREIGN PATENT DOCUMENTS

| | | |
|---|---|---|
| JP | 2007-200298 | 8/2007 |
| JP | 2009-187186 | 8/2009 |
| JP | 2011-089784 | 5/2011 |
| JP | 2012-181736 | 9/2012 |

OTHER PUBLICATIONS

"*Temporal Integration for Continuous Multimodal Biometrics*", Alphan Altinok, Matthew Turk, Computer Science Department, University of California, Santa Barbara; pp. 1-7.

"*Continuous Verification Using Multimodal Biometrics*", Terence Sim et al.; IEEE Transactions on Pattern Analysis and Machine Intelligence, vol. 29, No. 4, Apr. 2007; pp. 687-699.

"*Soft Biometric Traits for Continuous User Authentication*", Koichiro Niinuma et al.; IEEE Transactions on Information Forensics and Security, vol. 5, No. 4, Dec. 2010; pp. 771-779.

Japanese Office Action dated Jul. 12, 2016 in corresponding Japanese Patent Application No. 2013-010959 (4 pages) (4 pages English Translation).

\* cited by examiner

FIG. 7

| IMAGE ID | DIRECTION | TOTAL NUMBER OF PIXELS (PBR or PB) | SUBREGION ID (n) | NUMBER OF PIXELS (PBRn or PBn) | COLOR HISTOGRAM (R,G,B) | NUMBER OF PIXELS (pixel) |
|---|---|---|---|---|---|---|
| 1 | 3 | 6471 | 1 | 879 | (15,15,15) | 4 |
|   |   |   |   |   | (31,15,15) | 21 |
|   |   |   |   |   | ... | ... |
|   |   |   |   |   | (255,255,255) | 33 |
|   |   |   | 2 | 1436 | ... | ... |
|   |   |   |   |   | (255,255,255) | ... |
|   |   |   | 3 | 1823 | ... | ... |
|   |   |   |   |   | (255,255,255) | ... |
|   |   |   | 4 | 1436 | ... | ... |
|   |   |   |   |   | (255,255,255) | ... |
|   |   |   | 5 | 879 | ... | ... |
|   |   |   |   |   | (255,255,255) | ... |
| 2 | 2 | 8394 | 1 | ... | ... | ... |
|   |   |   | 2 | ... | ... | ... |
|   |   |   | 3 | ... | ... | ... |
|   |   |   | 4 | ... | ... | ... |
|   |   |   | 5 | ... | ... | ... |
| 3 | ... | ... | ... | ... | ... | ... |
| ... | ... | ... | ... | ... | ... | ... |

70

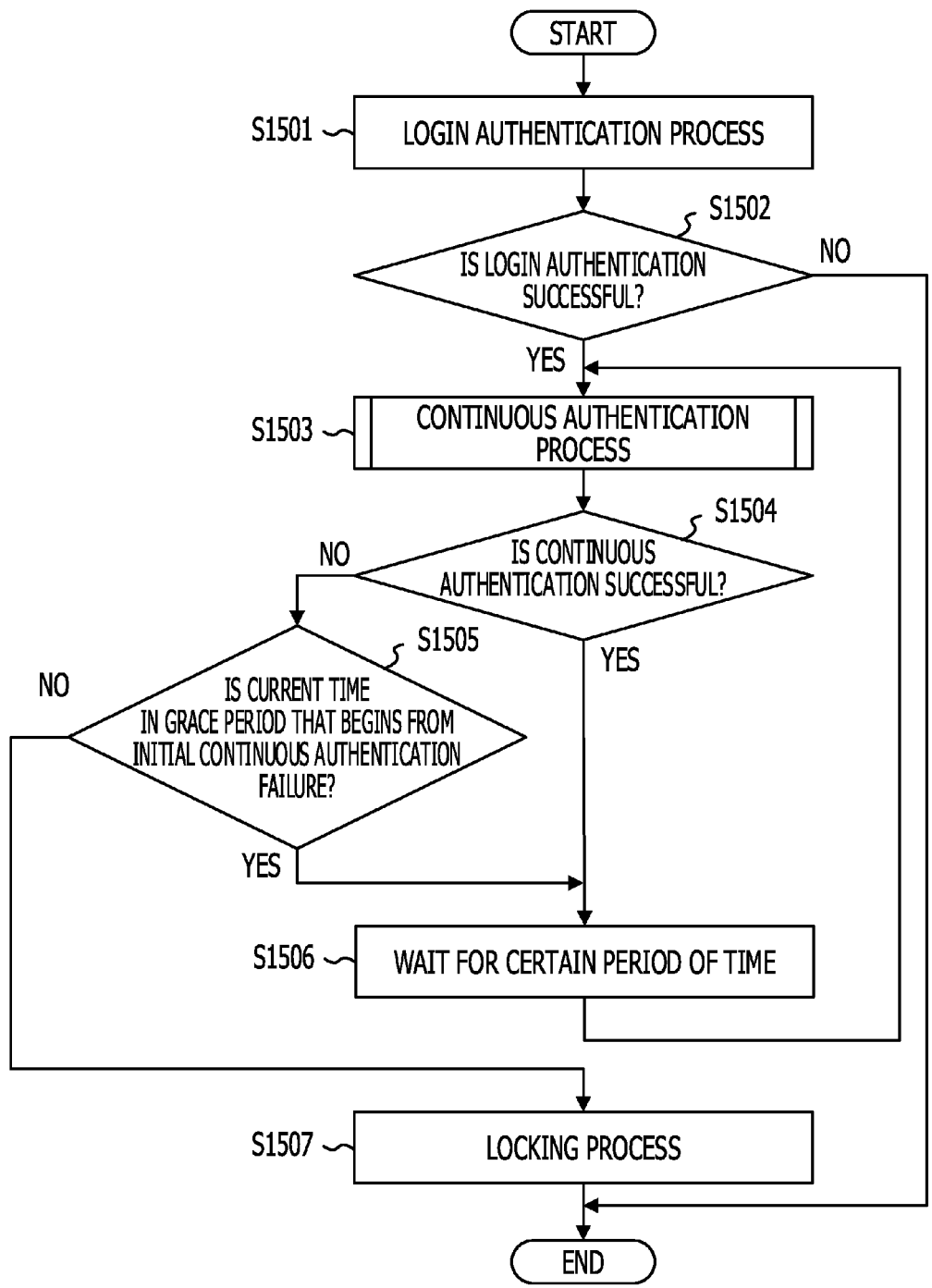

… (1) …

IMAGE PROCESSING DEVICE, METHOD FOR PROCESSING IMAGE

CROSS-REFERENCE TO RELATED APPLICATION

This application is based upon and claims the benefit of priority of the prior Japanese Patent Application No. 2013-010959, filed on Jan. 24, 2013, the entire contents of which are incorporated herein by reference.

FIELD

The embodiments discussed herein are related to, for example, an image processing device, a method for processing an image, and an image processing program used for continuous authentication of a user.

BACKGROUND

In these years, various pieces of information are held in information devices as the information devices are rapidly gaining in popularity. Therefore, it is significantly important to establish a security technique for suppressing leakage of information held in the information devices and the like, and various authentication techniques (for example, password authentication, biometric authentication, card authentication, and the like) have been proposed. In most of the known authentication techniques, however, an authentication process is performed only during login, and there is a problem that these authentication techniques have in common in that it is difficult to detect unauthorized use if, for example, an unauthorized third party uses the information device while an authorized user is leaving the position at which the information device is installed.

In order to solve the above problem, continuous authentication techniques have been proposed in which a user is continuously subjected to an authentication process after login. A typical example of the continuous authentication is continuous authentication realized by face recognition using feature vectors. In the face recognition, feature points that serve as the feature vectors of a face region corresponding to a user in an image are registered in advance, and continuous authentication is realized by detecting the user in the image on the basis of the correspondence between the registered feature points and feature points extracted during the authentication. For example, techniques relating to the continuous authentication are disclosed in F. Monrose and A. D. Rubin "Keystroke dynamics as a biometric for authentication", Future Generation Comput. Syst., vol. 16, pp. 351-359, 2000, A. Altinok and M. Turk "Temporal integration for Continuous Multimodal Biometrics", in Proc. Workshop on Multimodal User Authentication, 2003 and T. Sim, S. Zhang, R. Janakiraman, and S. Kumar "Continuous Verification using Multimodal Biometrics", IEEE Trans. Pattern Anal. Mach. Intell., vol. 29, no. 4, pp. 687-700, April 2007.

In addition, color histogram authentication using color histograms of captured images of a user has been proposed. The color histogram authentication is advantageous in that, compared to other methods using face recognition or the like, robust continuous authentication is possible relative to changes in the posture of the user. In the color histogram authentication, for example, a color histogram of a region (for example, a body region) corresponding to a user in an image is registered in advance, and continuous authentication is realized by detecting the body region of the user in the image on the basis of the similarity between the registered color histogram and the color histogram of a captured image and tracking the movement of the body region of the user. For example, a technique relating to the color histogram authentication is disclosed in K. Niinuma, U. Park, and A. K. Jain "Soft Biometric Traits for Continuous User Authentication", IEEE Transactions on Information Forensics and Security (TIFS), Vol. 5, No. 4, pp. 771-780, 2, 2010.

SUMMARY

In accordance with an aspect of the embodiments, an image processing device includes a processor; and a memory which stores a plurality of instructions, which when executed by the processor, cause the processor to execute: obtaining a first image and a second image; determining a first direction of a certain first reference point of a first region of a user included in the first image and a second direction of a certain second reference point of a second region of the user included in the second image; extracting a first feature quantity from the first region and a second feature quantity from the second region; generating a third feature quantity from the first feature quantity or a fourth feature quantity from the second feature quantity on the basis of the first direction or the second direction; and authenticating the user on the basis of similarity between the first feature quantity or the third feature quantity and the second feature quantity or the fourth feature quantity.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 7 is a table representing an example of the data structure of color histograms extracted by an extraction unit;

FIG. 15 is a flowchart illustrating a continuous authentication process performed by the continuous authentication apparatus;

DESCRIPTION OF EMBODIMENTS

An image processing device, a method for processing an image, and an image processing program according to an embodiment will be described hereinafter with reference to the drawings. This embodiment does not limit the technique disclosed herein.

First Embodiment

Figure 1:
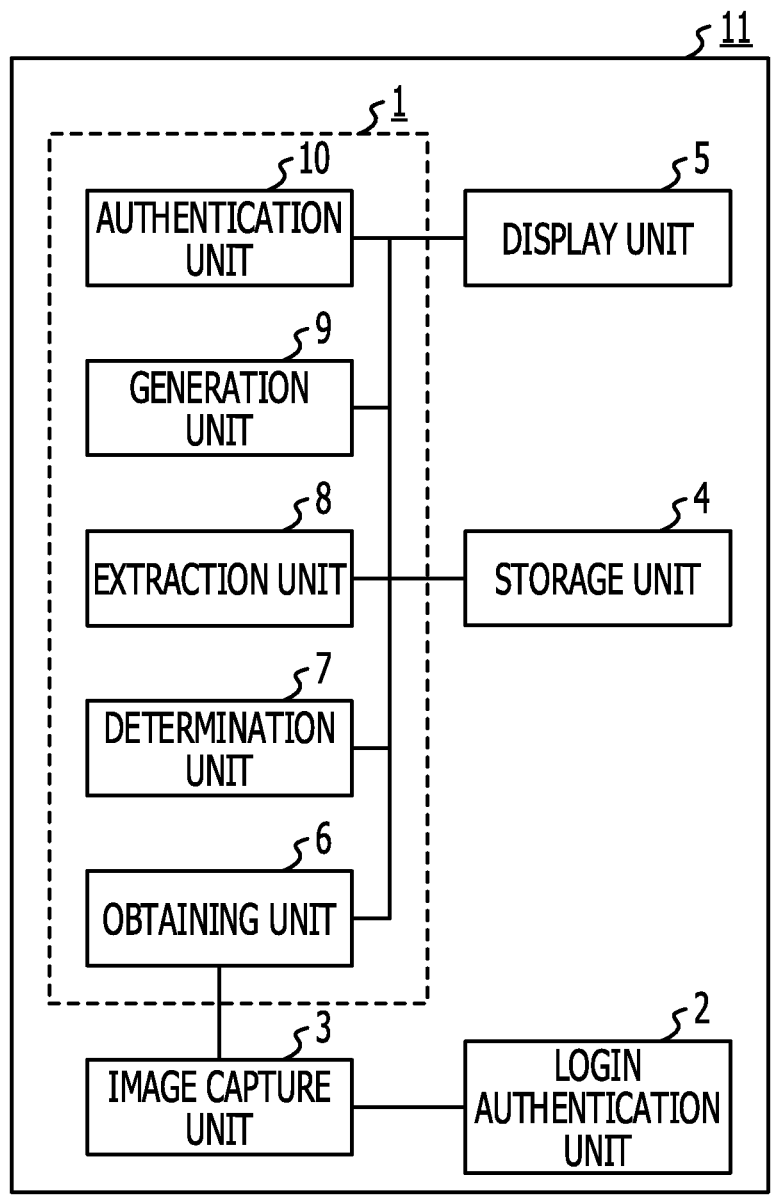
FIG. 1 is a functional block diagram illustrating a continuous authentication apparatus including an image processing device according to an embodiment.

FIG. 1 is a functional block diagram illustrating a continuous authentication apparatus 11 including an image processing device 1 according to a first embodiment. The continuous authentication apparatus 11 includes the image processing device 1, a login authentication unit 2, an image capture unit 3, a storage unit 4, and a display unit 5. Furthermore, the image processing device 1 includes an obtaining unit 6, a determination unit 7, an extraction unit 8, a generation unit 9, and an authentication unit 10.

The continuous authentication apparatus 11 is, for example, an apparatus that authenticates a user who uses an information device such as a personal computer (PC) or a mobile terminal. The continuous authentication apparatus 11 may be incorporated into or connected to the information device such as a PC or a mobile terminal used by the user. Alternatively, the information device itself may function as the continuous authentication apparatus 11. Furthermore, the continuous authentication apparatus 11 may be realized by causing a computer connected to the information device through a communication line to function as the continuous authentication apparatus 11, instead. In the first embodiment, the continuous authentication apparatus 11 will be described while taking client authentication type continuous authentication as an example, but the technique disclosed herein may be applied to server authentication type continuous authentication using the communication line. For example, when the server authentication type continuous authentication is to be performed, information used in a login authentication process, which will be described later, and an image of the user are received from the client. The server may then perform processes of the functions of the continuous authentication apparatus 11 and transmit a result of authentication to the client.

The login authentication unit 2 is, for example, a hardware circuit using a wired logic connection. Alternatively, the login authentication unit 2 may be a function module realized by a computer program executed by the continuous authentication apparatus 11. The login authentication unit 2 may perform the login authentication process for the user by applying one of various known authentication methods (for example, password authentication, biometric authentication, card authentication, and the like) as a method for authenticating a user.

The image capture unit 3 is, for example, an image capture device such as a charge-coupled device (CCD) or a complementary metal-oxide-semiconductor (CMOS) camera. For example, the image capture unit 3 captures, at certain time intervals, an image including a head region including a face region or a body region, which serves as a user region of a first user, who is using the information device after being subjected to the login authentication process performed by the login authentication unit 2 and who is authorized to use the information device, or a second user, who has not been subjected to the login authentication process performed by the login authentication unit 2 and who is not authorized to use the information device. The images captured by the image capture unit 3 at least include a first image, which is an image for registering the first user (in other words, an image captured immediately after a login process), and a second image, which is an image for authenticating the first user. The second user may be one user or may be a plurality of users other than the first user.

Figure 2:
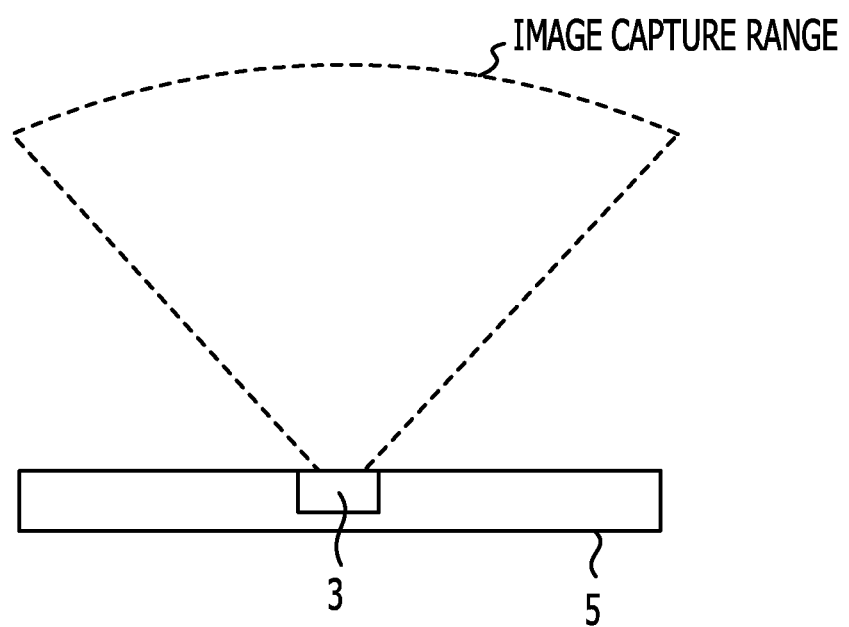
FIG. 2 is a diagram illustrating an example of an image capture range of an image capture unit.

FIG. 2 is a diagram illustrating an example of an image capture range of the image capture unit 3. As illustrated in FIG. 2, for example, the image capture unit 3 is mounted close to an upper end or a lower end of the center of a display surface of the display unit 5, which will be described later. Therefore, the image capture unit 3 having a certain image capture range based on optical characteristics is able to capture images of the first user who is staring at the display unit 5 and who is not illustrated.

The storage unit 4 illustrated in FIG. 1 is, for example, a semiconductor memory device such as a flash memory or a storage device such as a hard disk drive (HDD) or an optical disk. The storage unit 4 is not limited to one of the above storage devices, and may be a random-access memory (RAM) or a read-only memory (ROM). The storage unit 4 stores, for example, various pieces of data such as a color histogram extracted by the image processing device 1 and the like. The storage unit 4 does not have to be included in the continuous authentication apparatus 11. For example, various pieces of data may be stored in a cache, a memory, or the like, which is not illustrated, of each function unit included in the image processing device 1, instead. Alternatively, the storage unit 4 may be provided in an external apparatus other than the continuous authentication apparatus 11 when the storage unit 4 is connected, through the communication line, to a communication unit, which is not illustrated, provided in the continuous authentication apparatus 11 or the image processing device 1.

The display unit 5 is, for example, a display device such as a display. For example, the display unit 5 displays a result of authentication performed by the authentication unit 10 for the user. The image capture unit 3 may be mounted close to the upper end or the lower end of the center of the display surface of the display unit 5.

The obtaining unit 6 is, for example, a hardware circuit using a wired logic connection. Alternatively, the obtaining unit 6 may be a function module realized by a computer program executed by the image processing device 1. The obtaining unit 6 obtains, at certain time intervals, the first image or the second image captured by the image capture unit 3. The obtaining unit 6 may receive the first image or the second image from a component other than the image capture unit 3, instead. For example, the obtaining unit 6 may receive the first image or the second image from an external apparatus through the communication line using the communication unit, which is not illustrated. In this case, the image capture unit 3 does not have to be provided in the continuous authentication apparatus 11.

Figure 3A:
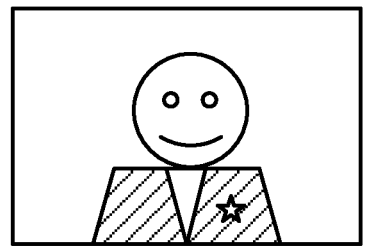
FIG. 3A is a diagram illustrating an example of a first image obtained by an obtaining unit.
Figure 3B:
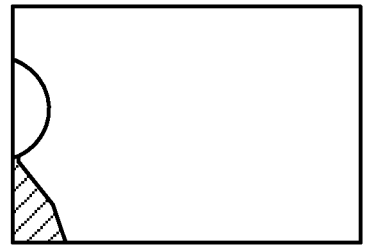
FIG. 3B is a diagram illustrating a first example of a second image obtained by the obtaining unit.
Figure 3C:
FIG. 3C is a diagram illustrating a second example of the second image obtained by the obtaining unit.
Figure 3D:
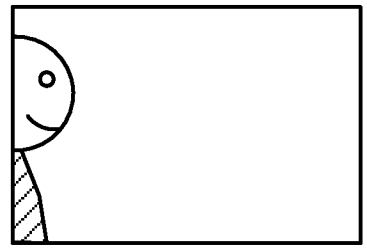
FIG. 3D is a diagram illustrating a third example of the second image obtained by the obtaining unit.
Figure 3E:
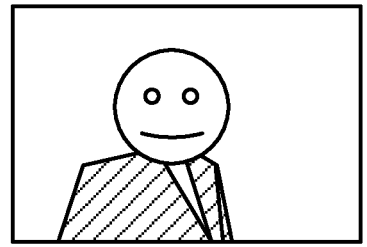
FIG. 3E is a diagram illustrating a fourth example of the second image obtained by the obtaining unit.

FIG. 3A is a diagram illustrating an example of the first image obtained by the obtaining unit 6. FIG. 3B is a diagram illustrating a first example of the second image obtained by the obtaining unit 6. FIG. 3C is a diagram illustrating a second example of the second image obtained by the obtaining unit 6. FIG. 3D is a diagram illustrating a third example of the second image obtained by the obtaining unit 6. FIG. 3E is a diagram illustrating a fourth example of the second image obtained by the obtaining unit 6. In FIGS. 3A and 3E, for example, the first user is seated facing the image capture unit 3 of the continuous authentication apparatus 11. The images illustrated in FIGS. 3A to 3E are images obtained by the obtaining unit 6 in this order. Furthermore, in the first embodiment, the image processing device 1 uses the first image illustrated in FIG. 3A as an image for registration and the second image illustrated in FIG. 3E as an image for authentication for convenience of description.

Figure 4A:
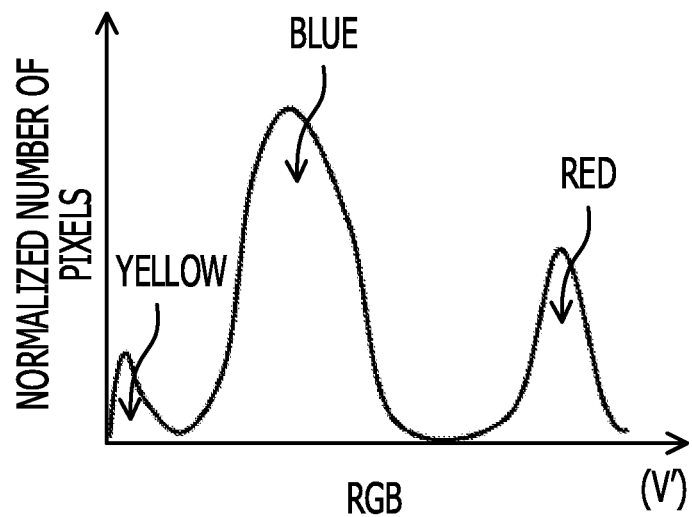
FIG. 4A is a conceptual diagram illustrating a color histogram extracted from a body region of a first user included in the first image illustrated in FIG. 3A
Figure 4B:
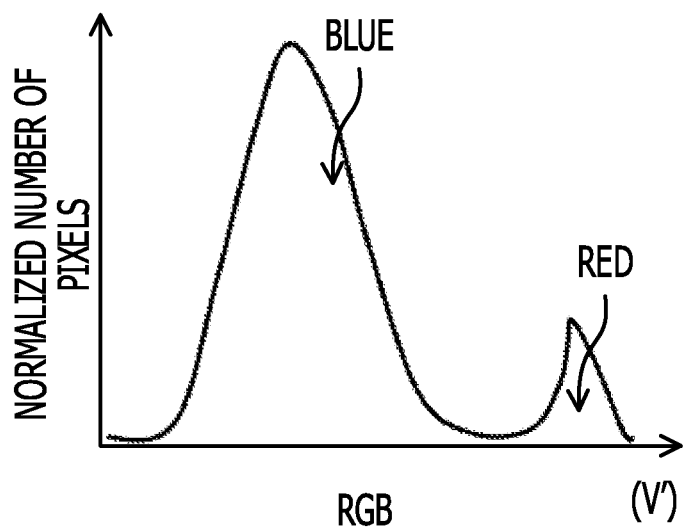
FIG. 4B is a conceptual diagram illustrating a color histogram extracted from the body region of the first user included in the second image illustrated in FIG. 3E.

FIG. 3A illustrates a case in which the body region of the first user squarely faces the image capture unit 3 (seated state). FIGS. 3B to 3D illustrate a case in which the first user leaves the seat and the body region of the first user temporarily deviates from the image capture range of the image capture unit 3 within time allowed by the continuous authentication apparatus 11. FIG. 3E illustrates a case in which the body region of the first user faces the image capture unit 3 sideways (seated state). In FIGS. 3A and 3E, the first user's face is directed forward (in other words, the center position of the head region does not change) since the first user is staring at the display unit 5 on which the image capture unit 3 is mounted. FIG. 4A is a conceptual diagram illustrating a color histogram extracted from the body region of the first user included in the first image illustrated in FIG. 3A. FIG. 4B is a conceptual diagram illustrating a color histogram extracted from the body region of the first user included in the second image illustrated in FIG. 3E. In FIGS. 4A and 4B, the horizontal axis represents bins (V') of color components of the RGB color space, and the vertical axis represents the normalized number of pixels obtained by normalizing the number of pixels using an arbitrary standard region size. Details of a process for extracting a color histogram will be described later.

As described above, FIG. 4A illustrates a color histogram extracted from the body region of the first user at a time when the body region of the first user squarely faces the image capture unit 3, and FIG. 4B illustrates a color histogram extracted from the body region of the first user at a time when the body region of the first user faces the image capture unit 3 sideways. Because, when the body region of the first user faces the image capture unit 3 sideways, an image of part of the body region is not captured compared to the case in which the body region of the first user squarely faces the image capture unit 3, the color histogram is no longer similar to that before the movement of the body region if the image of the part of the body region that is not captured includes a characteristic color. Therefore, the continuous authentication apparatus 11 determines in continuous authentication that the authentication of the first user has failed. At this time, it is difficult for the first user to understand why the authentication of the first user has failed, which decreases usability. In other words, when the direction of the body region is different between the image for registration and the image for authentication, an FRR increases.

Figure 5A:
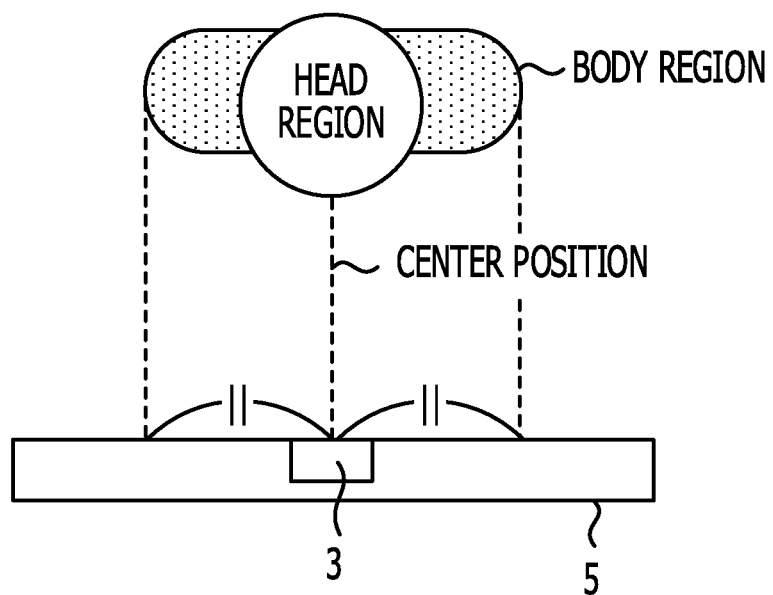
FIG. 5A is an example of an overhead view of the image capture unit and the first user at a time when the first image illustrated in FIG. 3A is captured and FIG. 5B is an example of an overhead view of the image capture unit and the first user at a time when the second image illustrated in FIG. 3E is captured.
Figure 5B:
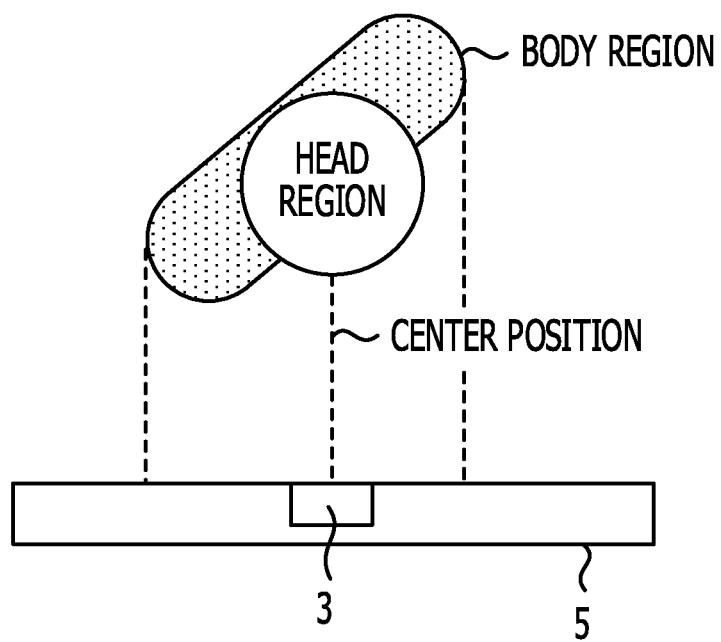

FIG. 5A is an example of an overhead view of the image capture unit 3 and the first user at a time when the first image illustrated in FIG. 3A is captured. FIG. 5B is an example of an overhead view of the image capture unit 3 and the first user at a time when the second image illustrated in FIG. 3E is captured. As illustrated in FIG. 5A, when the body region of the first user squarely faces the image capture unit 3, the center position of the head region in a horizontal direction (X-axis direction) is located at the center of the body region relative to the image capture unit 3. On the other hand, as illustrated in FIG. 5B, when the body region of the first user faces the image capture unit 3 sideways, the number of pixels of part of the body region located farther from the image capture unit 3 is smaller, and accordingly the center position of the head region in the horizontal direction (X-axis direction) becomes close to a left or right end of the body region. That is, it is possible to identify the direction of the body region of the first user on the basis of the relative positions of a reference point, which is, for example, the center position of the head region of the first user, and the center position of the body region. In the image processing device 1 disclosed in the first embodiment, the determination unit 7 illustrated in FIG. 1 determines the direction of the body region. Next, the generation unit 9 generates a corrected registration color histogram using a registration color histogram extracted from the image for registration on the basis of the direction or generates a corrected authentication color histogram using an authentication color histogram extracted from an authentication image. Therefore, even when the direction of the body region is different between the image for registration and the image for authentication, the user authentication may be normally performed.

The determination unit 7 illustrated in FIG. 1 is, for example, a hardware circuit using a wired logic connection. Alternatively, the determination unit 7 may be a function module realized by a computer program executed by the image processing device 1. The determination unit 7 receives the first image or the second image from the obtaining unit 6, and determines the head region and the body region of the first user included in the image. For example, the determination unit 7 determines the head region included in the first image, which is the image for registering the first user, as a third region and the body region included in the first image as a first region. In addition, for example, the determination unit 7 determines the head region included in the second image, which is the image for authenticating the first user, as a fourth region and the body region included in the second image as a second region.

The determination unit 7 may determine the third region and the fourth region, which are the head regions of the first user included in the first image and the second image, respectively, using any known method such as, for example, a Haar classifier disclosed in P. Viola and M. Jones "Rapid Object Detection using a Boosted Cascade of Simple Features", in Proc. IEEE Computer Vision and Pattern Recognition, pp. 1-511 to 1-518, 2001 or a Gabor wavelet transform. For example, the determination unit 7 detects a head region that is a rectangular region, and determines a reference point, which is the center coordinate (in the horizontal direction of the image) of the head region on the basis of the center coordinates of the coordinates of the four corners of the rectangular region. Here, the center coordinate of the head region included in the first image, which is the image for registration, will be referred to as a first reference point, and the center coordinate of the head region included in the second image, which is the image for authentication, will be referred to as a second reference point.

The determination unit 7 may determine the first region and the second region, which are the body regions of the first user included in the first image and the second image, respectively, on the basis of, for example, a difference image between frames (for example, an image at a time t and an image at a time t−1 obtained by the obtaining unit 6). More specifically, the determination unit 7 may extract pixels at which differences between the pixel values of corresponding pixels between frames are equal to or larger than a certain threshold as changed pixels while taking into consideration that the positional relationship between the image capture unit 3 and the background included in the first image and the second image remains the same while the first user is continuously moving slightly, if not significantly. The determination unit 7 may then determine the first region or the second region using the outline of an extracted changed pixel region. In addition, the determination unit 7 may determine the third region or the fourth region using the outline of a changed pixel region.

Figure 6:
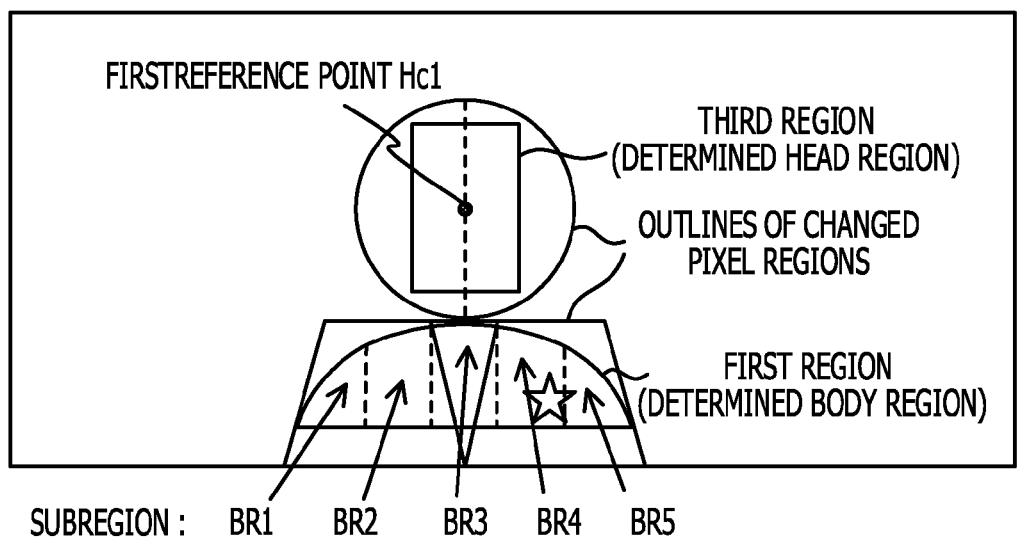
FIG. 6 is a conceptual diagram illustrating a first region, a third region, and subregions determined by a determination unit.

For example, the determination unit 7 detects a semi-elliptical region on the basis of the outline of a changed pixel region, and determines the semi-elliptical region as the first region or the second region. Furthermore, the determination unit 7 divides the semi-elliptical region into, for example, certain subregions. FIG. 6 is a conceptual diagram illustrating the first region, the third region, and the subregions determined by the determination unit 7. Although the first region, the third region, and the subregions of the first region will be described hereinafter with reference to FIG. 6, the same holds true for the second region, the fourth region, and the subregions of the second region, and accordingly detailed description of these regions is omitted.

As illustrated in FIG. 6, for example, the determination unit 7 determines a first reference point Hc1, which is located at the center coordinates of the coordinates of the four corners of the third region that is a rectangular region. In addition, the determination unit 7 determines a semi-elliptical region on the basis the outline of a changed pixel region, and determines the semi-elliptical region as the first region. More specifically, the determination unit 7 determines the first region of the first user as a semi-elliptical region BR having a height half that of the first region of the first user. An upper end of the semi-elliptical region BR may be, for example, a Y coordinate located a quarter of the height of the third region lower than a lower end of the third region. A lower end of the semi-elliptical region BR may be, for example, a Y coordinate located half the height of the third region lower than the upper end of the semi-elliptical region BR. In addition, left and right ends of the semi-elliptical region BR may be, for example, intersections between the lower end of the semi-elliptical region BR and the outline of the changed pixel region.

Next, the determination unit 7 determines n subregions obtained by dividing the semi-elliptical region BR in an X direction as, for example, subregions BR1 to BRn from left to right. The determination unit 7 may use a division method in which, for example, the semi-elliptical region BR is evenly divided into n subregions in the X direction. In FIG. 6, n=5. The determination unit 7 may determine n to be an odd number equal to or larger than 3.

The determination unit 7 identifies one of the subregions BR1 to BRn that includes the X coordinate of the first reference point Hc1, and determines a first direction DR, which is the direction of the first region of the first user in the first image, on the basis of the identified subregion. DR is an integer from 0 to n. Here, if DR=(n+1)/2, the head region exists at the center of the body region, which means that the first direction DR of the first user is to squarely face the image capture unit 3. On the other hand, if DR<(n+1)/2, the first direction DR is to face the image capture unit 3 leftward, and if DR>(n+1)/2, the first direction DR is to face the image capture unit 3 rightward. In other words, the determination unit 7 may determine the first direction DR of the first user on the basis of the relative positions of the first reference point Hc1 and the center position of the body region.

In addition, the determination unit 7 identifies one of subregions B1 to Bn, which are the subregions of the second region, that includes the X coordinate of a second reference point Hc2 using the same method as the method for determining the first direction DR, and determines a second direction D, which is the direction of the second region of the first user in the second image, on the basis of the identified subregion. The determination unit 7 outputs the subregions BR1 to BRn in the first image, the subregions B1 to Bn in the second image, the first direction DR, and the second direction D that have been determined to the extraction unit 8.

The extraction unit 8 illustrated in FIG. 1 is, for example, a hardware circuit using a wired logic connection. Alternatively, the extraction unit 8 may be a function module realized by a computer program executed by the image processing device 1. The extraction unit 8 receives the subregions BR1 to BRn in the first image, the subregions B1 to Bn in the second image, the first direction DR, and the second direction D from the determination unit 7. The extraction unit 8 extracts color histograms HBR1 to HBRn of the subregions BR1 to BRn, respectively, determined by the determination unit 7 in the first image and numbers of pixels PBR1 to PBRn included in the subregions BR1 to BRn, respectively. The extraction unit 8 also extracts color histograms HB1 to HBn of the subregions B1 to Bn, respectively, determined by the determination unit 7 in the second image and numbers of pixels PB1 to PBn included in the subregions B1 to Bn, respectively. A histogram obtained by combining the color histograms HBR1 to HBRn and a histogram obtained by combining the color histograms HB1 to HBn are color histograms HBR and HB of the first region and the second region, respectively, but the extraction unit 8 may independently extract the color histograms HBR and HB, instead. Furthermore, the extraction unit 8 may extract the color histograms of the head regions, and use the color histograms along with the color histograms HBR and HB in a continuous authentication process.

A process for extracting color histograms performed by the extraction unit 8 will be described hereinafter. For example, when the RGB level of the first image and the second image is 256 tones, the extraction unit 8 divides each component of the RGB color space into 16 pieces for target pixels in the head region and the body region in the first and second images, thereby obtaining 16×16×16=4,096 tones. If the pixel value of R is denoted by Vr (0 to 255), bins Vr' obtained by dividing R into 16 pieces may be represented by the following expression:

$$Vr' = Vr \times 16/256 \quad \text{(Expression 1)}$$

Bins Vg' obtained by dividing G into 16 pieces if the pixel value of G is denoted by Vg (0 to 255) and bins Vb' obtained by dividing B into 16 pieces if the pixel value of B is denoted by Vb (0 to 255) may be calculated using the same method as that used for the bins Vr', and accordingly detailed description thereof is omitted. The extraction unit 8 calculates a pixel level V', for which 4,096 tones have been obtained, represented by the following expression using the calculated bins Vr', Vg', and Vb'.

$$V' = Vr' \times 16 \times 16 + Vg' \times 16 + Vb' \quad \text{(Expression 2)}$$

The extraction unit 8 determines arrays obtained by calculating the sums of pixels of the third and fourth regions (head regions) and the first and second regions (body regions) in accordance with the 4,096 tones as color histograms. Thus, the extraction unit 8 may extract color histograms. FIG. 7 is a table representing an example of the data structure of the color histograms extracted by the extraction unit 8. In a table 70 illustrated in FIG. 7, image identifiers (IDs) are provided for the images obtained by the obtaining unit 6. In the first embodiment, an image ID of 1 corresponds to the first image, and an image ID of 2 corresponds to the second image for convenience of description. In the table 70, the directions of the first region and the second region, the total numbers of pixels (PBR and PB), which are the numbers of pixels of the first region and the second region, subregion IDs (n) corresponding to the subregions BR1 to BRn and B1 to Bn, and the numbers of pixels (PBRn and PBn) corresponding to the subregions BR1 to BRn and B1 to Bn determined by the determination unit 7 are stored. In addition, the color histograms (R, G, B) included in the table 70 represent color histograms using the ratios of colors input to the value ranges of the bins Vr', the bins Vg', and the bins Vb'. Alternatively, the extraction unit 8 may use a color space other than the RGB color space (for example, the HSV color space, the CMK color space, the YCbCr color space, or the like) in extraction of color histograms. Furthermore, the numbers of pixels (pixel) included in the color histograms are stored in the table 70.

As illustrated in FIGS. 4A and 4B, the extraction unit 8 may generate normalized histograms obtained by normalizing the numbers of pixels using an arbitrary standard region size while taking into consideration that when the region sizes (the numbers of pixels included in regions) of color histograms to be compared are different from each other, a process for calculating similarity between the different color histograms becomes complex. In the first embodiment, the extraction unit 8 generates normalized histograms for convenience of description. In addition, the extraction unit 8 may store the shapes of the first region and the second region and additional information such as positional information regarding the shapes in the table 70 illustrated in FIG. 7 as region shape/positional information. For example, the extraction unit 8 outputs the data structure represented by the table 70 illustrated in FIG. 7 to the generation unit 9.

Figure 8A:
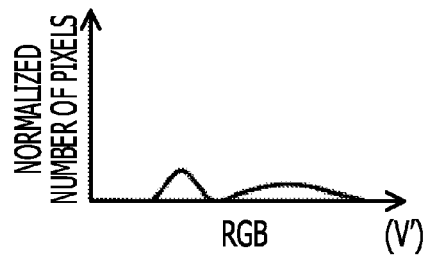
FIG. 8A is a conceptual diagram illustrating a color histogram of a subregion of the first region in the first image.
Figure 8B:
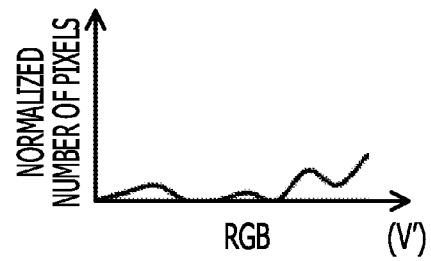
FIG. 8B is a conceptual diagram illustrating a color histogram of another subregion.
Figure 8C:
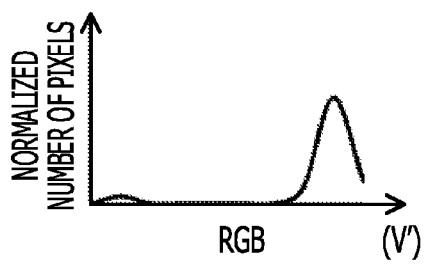
FIG. 8C is a conceptual diagram illustrating a color histogram of another subregion.
Figure 8D:
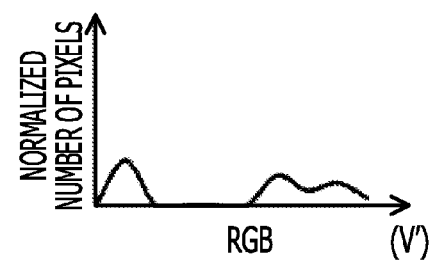
FIG. 8D is a conceptual diagram illustrating a color histogram of another subregion.
Figure 8E:
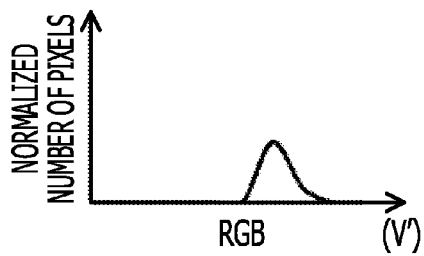
FIG. 8E is a conceptual diagram illustrating a color histogram of another subregion.
Figure 8F:
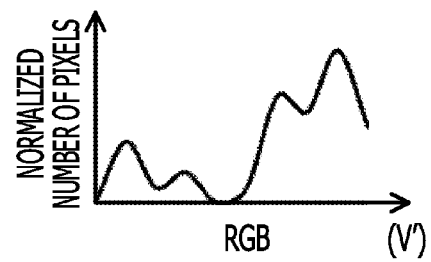
FIG. 8F is a conceptual diagram illustrating a color histogram of the first region.

FIG. 8A is a conceptual diagram illustrating the color histogram HBR1 of the subregion BR1 of the first region in the first image. FIG. 8B is a conceptual diagram illustrating the color histogram HBR2 of the subregion BR2. FIG. 8C is a conceptual diagram illustrating the color histogram HBR3 of the subregion BR3. FIG. 8D is a conceptual diagram illustrating the color histogram HBR4 of the subregion BR4. FIG. 8E is a conceptual diagram illustrating the color histogram HBR5 of the subregion BR5. FIG. 8F is a conceptual diagram illustrating a color histogram HR of the first region. The color histogram obtained by combining the color histograms illustrated in FIGS. 8A to 8E is the color histogram illustrated in FIG. 8F. In FIGS. 8A to 8F, the horizontal axes represent the bins (V') of the color components of the RGB color space, and the vertical axes represent the normalized number of pixels obtained by normalizing the number of pixels using an arbitrary standard region size.

Figure 9A:
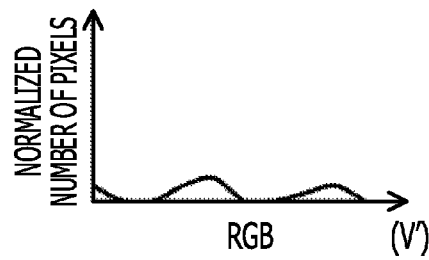
FIG. 9A is a conceptual diagram illustrating a color histogram of a subregion of a second region in the second image.
Figure 9B:
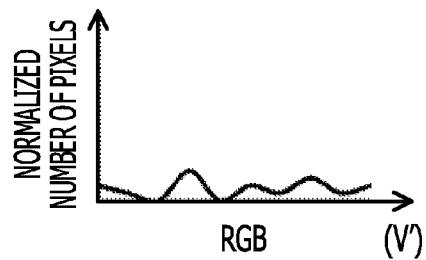
FIG. 9B is a conceptual diagram illustrating a color histogram of another subregion.
Figure 9C:
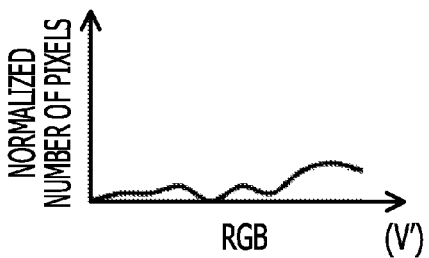
FIG. 9C is a conceptual diagram illustrating a color histogram of another subregion.
Figure 9D:
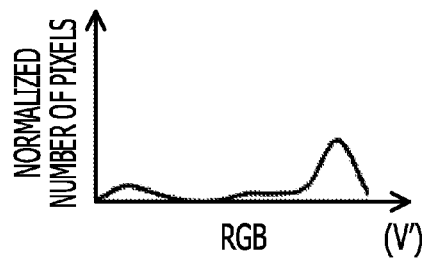
FIG. 9D is a conceptual diagram illustrating a color histogram of another subregion.
Figure 9E:
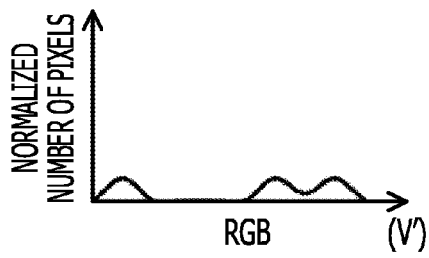
FIG. 9E is a conceptual diagram illustrating a color histogram of another subregion.
Figure 9F:
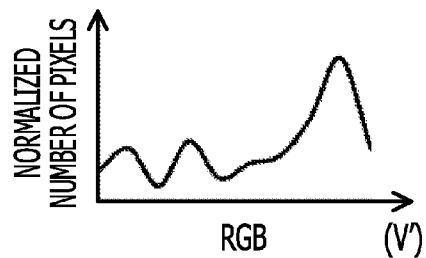
FIG. 9F is a conceptual diagram illustrating a color histogram of the second region.

FIG. 9A is a conceptual diagram illustrating the color histogram HB1 of the subregion B1 of the second region in the second image. FIG. 9B is a conceptual diagram illustrating the color histogram HB2 of the subregion B2. FIG. 9C is a conceptual diagram illustrating the color histogram HB3 of the subregion B3. FIG. 9D is a conceptual diagram illustrating the color histogram HB4 of the subregion B4. FIG. 9E is a conceptual diagram illustrating the color histogram HB5 of the subregion B5. FIG. 9F is a conceptual diagram illustrating a color histogram H of the second region. The color histogram obtained by combining the color histograms illustrated in FIGS. 9A to 9E is the color histogram illustrated in FIG. 9F. In FIGS. 9A to 9F, the horizontal axes represent the bins (V') of the color components of the RGB color space, and the vertical axes represent the normalized number of pixels obtained by normalizing the number of pixels using an arbitrary standard region size. By comparing FIGS. 8A to 8F and FIGS. 9A to 9F, it may be seen that the color histograms are significantly different from each other since the first direction and the second direction are different from each other, and therefore the similarity between the color histograms is low.

The generation unit 9 illustrated in FIG. 1 is, for example, a hardware circuit using a wired logic connection. Alternatively, the generation unit 9 may be a function module realized by a computer program executed by the image processing device 1. The generation unit 9 receives, for example, the data structure represented by the table 70 illustrated in FIG. 7 from the extraction unit 8. The generation unit 9 generates a corrected registration color histogram HR' from the registration color histogram HR extracted from the first image and a corrected authentication color histogram H' from the authentication color histogram H extracted from the second image. In the first embodiment, a method for generating a corrected registration color histogram HBR' adapted to the second direction, which is the direction of the body region in the second image captured during authentication, on the basis of the registration color histograms (HBR and HBR1 to HBRn), the number of pixels of the subregions (PBR1 to PBRn), and the like. Although a color histogram may be generated on the basis of any different combination in the present disclosure, any color histogram may be generated by using a method that will be described hereinafter, and accordingly description of such different combinations is omitted. In addition, the registration color histogram HR, the corrected registration color histogram HR', the authentication color histogram H, and the corrected authentication color histogram H' may be referred to as a first feature quantity, a third feature quantity, a second feature quantity, and a fourth feature quantity, respectively.

The generation unit 9 may calculate the corrected registration color histogram HR' using the following expression:

$$HR' = \sum_{m=1}^{n} \left( HBR_m * \frac{PBR_{(m+(D-DR))}}{PBR_m} \right)$$ (Expression 3)

However, when (m+(D−DR))<1 or (m+(D−DR))>n, PBR(m+(D−DR))=0.

Expression 3 is an expression for obtaining the total value of the color histogram at a time when the first region whose center position is the first direction DR has been moved such that the center position becomes the second direction D. In Expression 3, the color histogram of each subregion is multiplied by a quotient of the number of pixels after the movement by the number of pixels before the movement as a weighting value. In Expression 3, n denotes the number of subregions, namely, for example, n=5. m denotes the position of a subregion before the movement, namely, for example, m is any of 1 to 5. As described above, since the first direction of the first region in the first image, which is the image for registration, is denoted by DR and the second direction of the second region in the second image, which is the image for authentication, is denoted by D, D−DR refers to the amount of change in the direction of the first user from the first image. In addition, the subregion number after the movement of the subregion m may be expressed as m+(D−DR). For example, when the first direction DR is 3 and the second direction D is 4, the subregion number after the movement of the subregion m is m+1.

In Expression 3, the weighting value $PBR_{(m+(D-DR))}/PBR_m$ for weighting corresponds to the rate of change in the size of a subregion before and after the movement, and is used as the weighting value for a color histogram HBRm. For example, when the subregion number m=3, the first direction DR=3, and the second direction D=4, the subregion number after the movement is m+1=4. When the number of pixels PBR3=1,000 and the number of pixels PBR4=800 in the region of m=3, the weighting value $PBR_{(m+(D-DR))}/PBR_m$ is 0.8.

Figure 10:
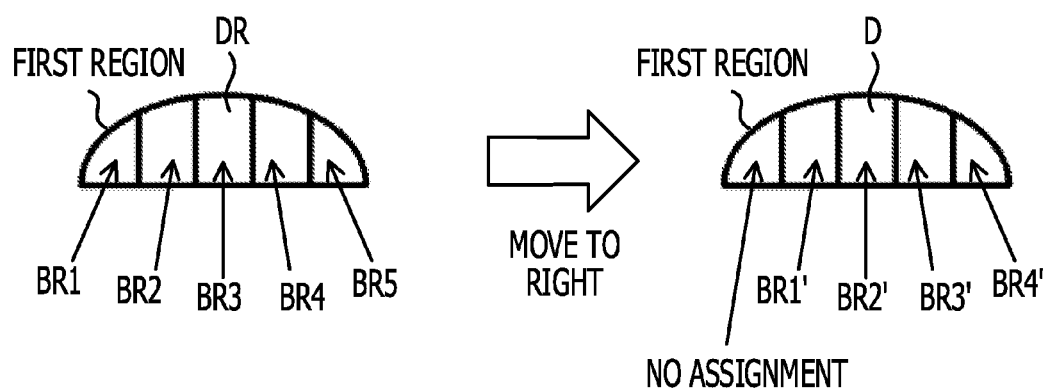
FIG. 10 is a diagram illustrating an example in which part of the first region is not added to the color histogram.

In Expression 3, part of the first region might not be added to the color histogram due to the movement. FIG. 10 is a diagram illustrating an example in which part of the first region is not added to the color histogram. In the example illustrated in FIG. 10, the generation unit 9 generates the corrected registration color histogram HR' by obtaining subregions BR1' to BR4' obtained by moving the subregions BR1 to BR5 to the right by one subregion during calculation of the color histogram with the first direction DR=3 and the second direction D=4. At this time, no subregion is assigned to the leftmost subregion. In this case, the generation unit 9 may process the leftmost subregion as "no assignment", or may add the color histogram (for example, the color histogram HBR1) of the subregion adjacent to the leftmost subregion. The generation unit 9 may generate the corrected registration color histogram HR' by performing addition while changing the weight. In the first embodiment, the generation unit 9 processes a subregion to which no subregion is assigned as "no assignment" for convenience of description.

The generation unit 9 obtains the authentication color histogram H of the second region in the second image. The generation unit 9 may calculate the authentication color histogram H using the following expression:

$$H = \sum_{m=1}^{n} HB_m$$ (Expression 4)

As described above, when the color histogram HBR1 has not been added to the subregion to which no subregion is assigned, the subregion (subregion BR1 in the example illustrated in FIG. 10) that has not been added is not added. If the color histogram HBR1 has been added, Expression 4 may be used. The generation unit 9 outputs the generated corrected registration color histogram HR' and the authentication color histogram H to the authentication unit 10.

Figure 11A:
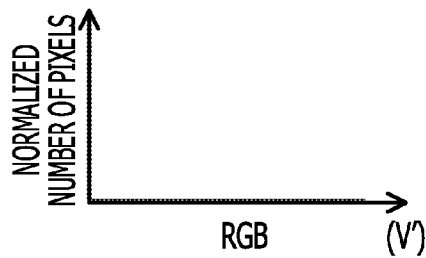
FIG. 11A is a conceptual diagram illustrating a corrected registration color histogram of a subregion of the first region in the first image.
Figure 11B:
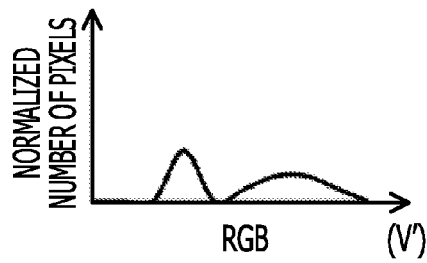
FIG. 11B is a conceptual diagram illustrating a corrected registration color histogram of another subregion.
Figure 11C:
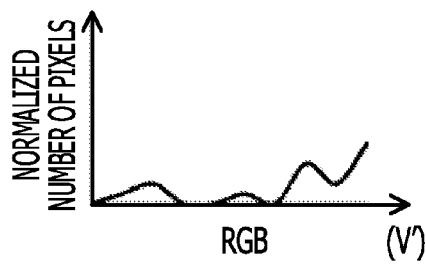
FIG. 11C is a conceptual diagram illustrating a corrected registration color histogram of another subregion.
Figure 11D:
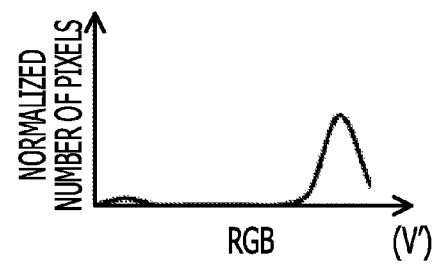
FIG. 11D is a conceptual diagram illustrating a corrected registration color histogram of another subregion.
Figure 11E:
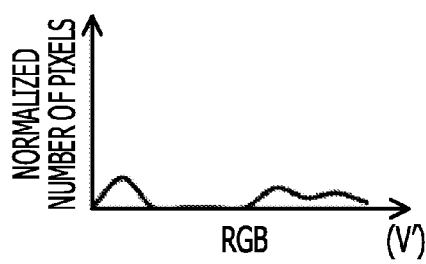
FIG. 11E is a conceptual diagram illustrating a corrected registration color histogram of another subregion.
Figure 11F:
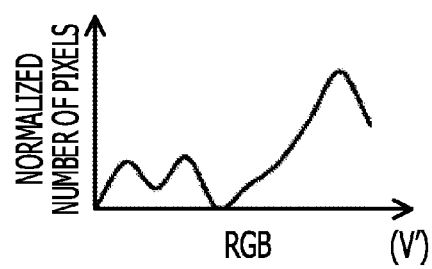
FIG. 11F is a conceptual diagram illustrating a corrected registration color histogram of the first region.

FIG. 11A is a conceptual diagram illustrating a corrected registration color histogram HBR1' of the subregion BR1 of the first region in the first image. FIG. 11B is a conceptual diagram illustrating a corrected registration color histogram HBR2' of the subregion BR2. FIG. 11C is a conceptual diagram illustrating a corrected registration color histogram HBR3' of the subregion BR3. FIG. 11D is a conceptual diagram illustrating a corrected registration color histogram HBR4' of the subregion BR4. FIG. 11E is a conceptual diagram illustrating a corrected registration color histogram HBR5' of the subregion BR5. FIG. 11F is a conceptual diagram illustrating the corrected registration color histogram HR' of the first region. The color histogram obtained by combining the color histograms illustrated in FIGS. 11A to 11E is the corrected registration color histogram illustrated in FIG. 11F. In FIGS. 11A to 11F, the horizontal axes represent the bins (V') of the color components of the RGB color space, and the vertical axes represents the normalized number of pixels obtained by normalizing the number of pixels using an arbitrary standard region size.

In FIGS. 11A to 11F, since the first direction DR=3 and the second direction D=4, the color histograms of the subregions of the first region have moved to the right by one subregion, and accordingly color histograms are obtained in which no subregion is assigned to HBR1', HBR2'=HBR1× weighting value, HBR3'=HBR2×weighting value, HBR4'=HBR3×weighting value, and HBR5'=HBR4× weighting value.

Figure 12:
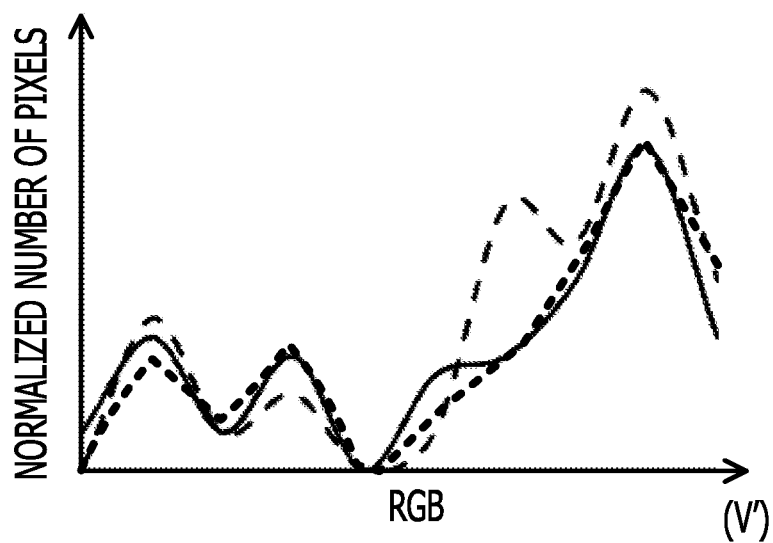
FIG. 12 is a diagram illustrating a comparison between the registration color histogram, the corrected registration color histogram, and the authentication color histogram.

FIG. 12 is a diagram illustrating a comparison between the registration color histogram HR, the corrected registration color histogram HR', and the authentication color histogram H. The authentication color histogram H illustrated in FIG. 12 is obtained by combining the four histograms HB2 to HB5 without adding the histogram HB1 in accordance with the corrected registration color histogram HR'. As may be seen from the diagram illustrated in FIG. 12, the corrected registration color histogram HR' generated by the generation unit 9 is more similar to the authentication color histogram H than the registration color histogram HR before the correction. Therefore, the authentication of the user may be normally performed even when the direction of the body region is different between the image for registration and the image for authentication, and accordingly usability may be improved while maintaining robustness. Alternatively, the generation unit 9 may calculate common subregions between the first region and the second region on the basis of a difference between the first direction and the second direction, and generate the corrected registration color histogram HR' on the basis of only the common subregions.

Figure 13A:
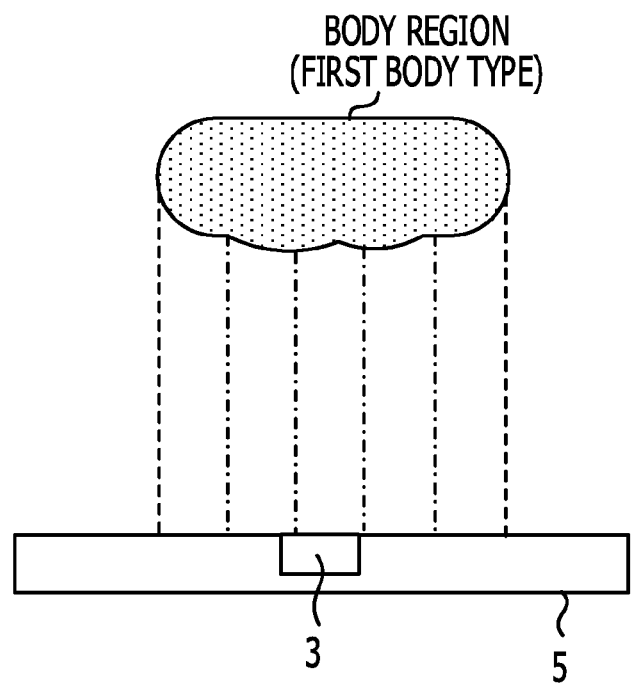
FIG. 13A is a first example of an overhead view of the image capture unit and a first body type and FIG. 13B is a first example of an overhead view of the image capture unit and a second body type.
Figure 13B:
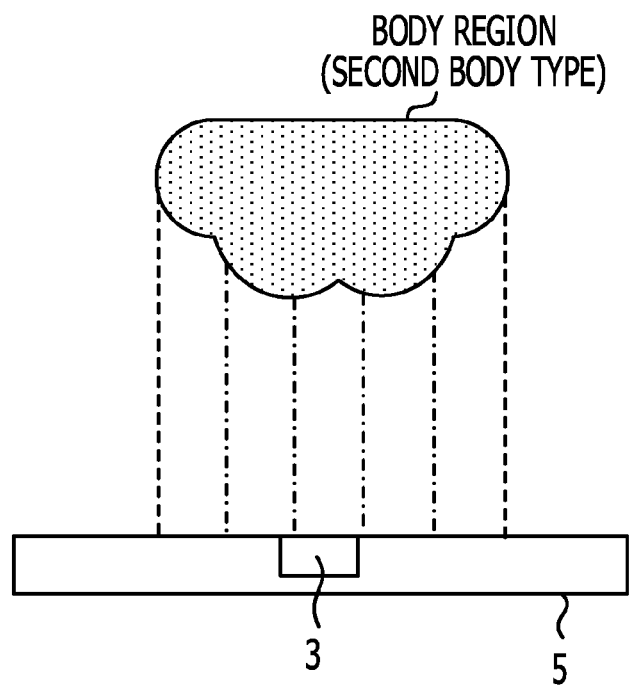
Figure 14A:
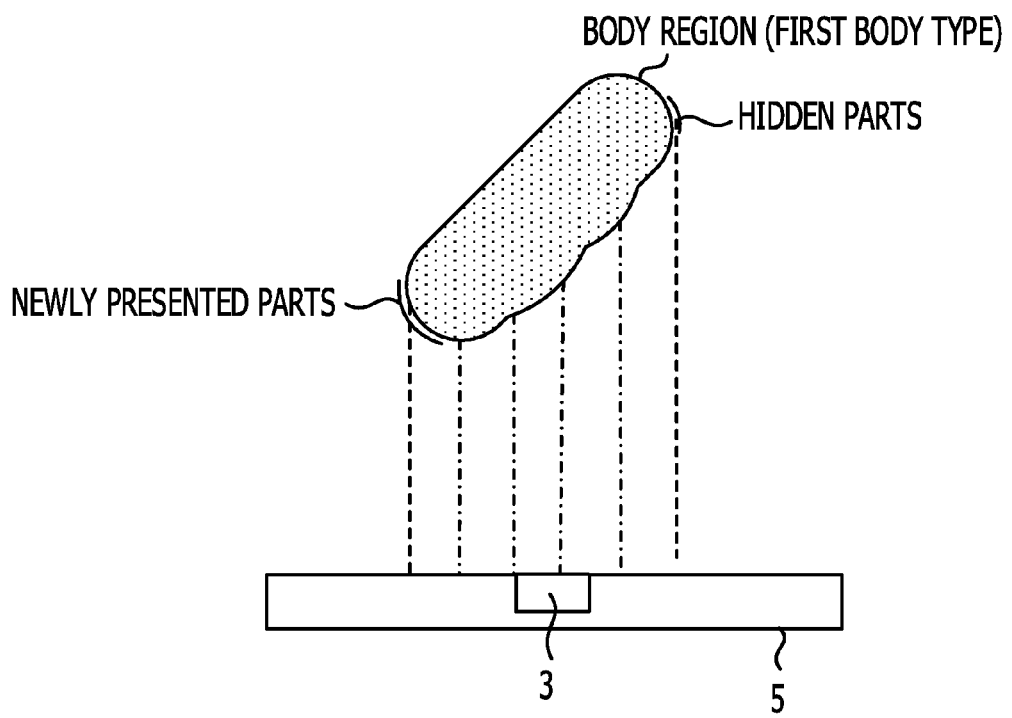
FIG. 14A is a second example of the overhead view of the image capture unit and the first body type and FIG. 14B is a second example of the overhead view of the image capture unit and the second body type.
Figure 14B:
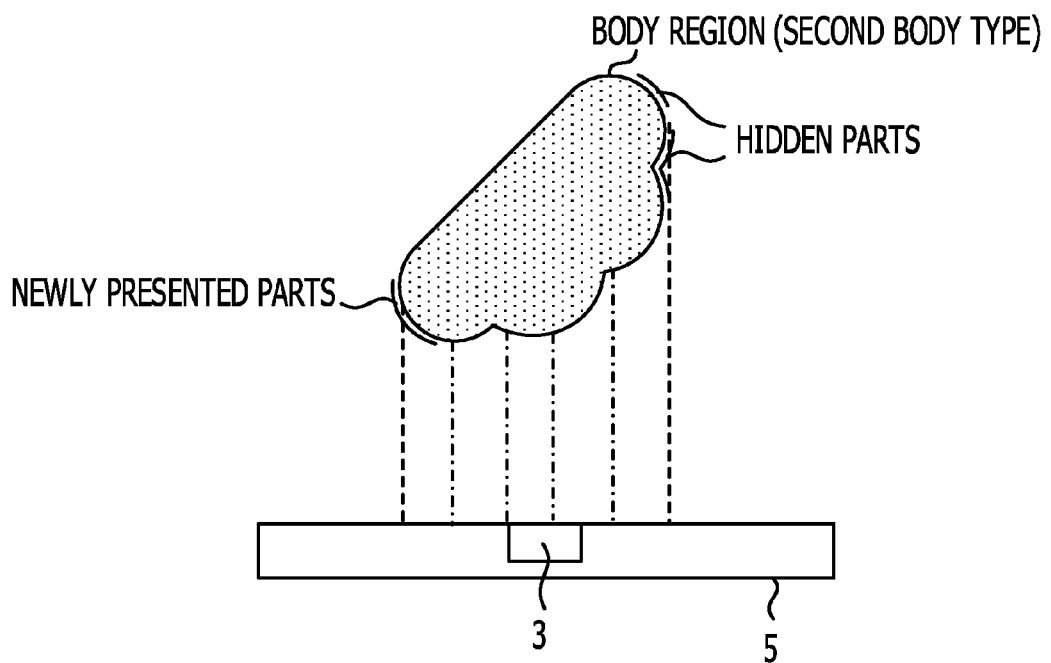

In the weighting process performed by the generation unit 9 according to the first embodiment, the following advantageous effects are produced. FIG. 13A is a first example of an overhead view of the image capture unit 3 and a first body type. FIG. 13B is a first example of an overhead view of the image capture unit 3 and a second body type. FIG. 14A is a second example of the overhead view of the image capture unit 3 and the first body type. FIG. 14B is a second example of the overhead view of the image capture unit 3 and the second body type. The first body type and the second body type illustrated in FIGS. 13A, 13B, 14A, and 14B are examples of the body type of the first user that reflects round portions such as shoulders and a chest. In the overhead views of FIGS. 13A, 13B, 14A, and 14B, the head region of the first user is not illustrated. As illustrated in FIGS. 13A and 13B, when the body region of the first user squarely faces the image capture unit 3, distances from the image capture unit 3 to the first user's shoulders, which are parts of the body region of the first user, are substantially the same.

On the other hand, as illustrated in FIGS. 14A and 14B, when the body region of the first user faces the image capture unit 3 sideways, that is, for example, when the body region is directed to the left, the right shoulder becomes close to the image capture unit 3 while the left shoulder becomes far from the image capture unit 3. With respect to the right shoulder, which is close to the image capture unit 3, the right shoulder and right arm regions that have not been presented to (in other words, captured by) the image capture unit 3 when the body region squarely faces the image capture unit 3 are newly presented. Furthermore, as described above, since parts of the body region of a human, which is the first user here, such as the shoulders and the chest are round when viewed from above, some parts that are far from the image capture unit 3 are hidden by parts that are close to the image capture unit 3 and not captured in the first and second images.

Thus, when the direction of the body region of the first user is different between the first image and the second image, some parts are hidden from the image capture unit 3 and some parts are newly presented to the image capture unit 3. When the body region is directed to the left, a left part of the body region, which becomes far from the image capture unit 3, is hidden, and a right part of the body region, which becomes close to the image capture unit 3, is newly presented. When the body region is directed to the right, the right part of the body region, which becomes far from the image capture unit 3, is hidden, and the left part of the body region, which becomes close to the image capture unit 3, is newly presented. When the body region of the first user is further directed to the left or right, the areas of the parts hidden from the image capture unit 3 and the parts newly presented to the image capture unit 3 increase.

At this time, if the registration color histogram HR and the authentication color histogram H are directly compared, the color histograms including the colors of the parts hidden from the image capture unit 3 and the parts newly presented to the image capture unit 3 are compared. When the first user wears clothes in which these parts include colors different from other parts, the color histograms become different from each other, thereby causing the authentication to fail. In the first embodiment, however, the body region is divided into a plurality of subregions in the horizontal direction while taking into consideration that the color histogram is likely to change at the left and right ends of the body region in accordance with the direction of the body region and the areas of the parts that are likely to change the color histogram increase or decrease in accordance with the amount of change in the direction. In addition, the direction of the body region of the first user is determined and the color histograms of the subregions of the first region are moved to the left or right on the basis of the direction and weighted. When the first user squarely faces the image capture unit 3 in the first image and is directed to the left in the second image, the color histograms of the subregions of the first region are moved to the right and weighted. For example, when the first direction of the first user in the first image is the left and the second direction of the second image is forward, the color histograms of the subregions extracted from the first image are moved to the left.

When the second direction of the body region of the first user is the left direction in the second image captured during the authentication, the parts newly presented to the image capture unit 3 are assumed to be located at the left end of the body region in the image. When the color histograms of the subregions are moved to the right, no subregion is assigned to this subregion, and therefore the weighting value is zero and the color histogram of this subregion is not added to the overall color histogram. Furthermore, since the parts at the right end of the body region in the image are hidden from the image capture unit 3 after the movement, the weighting value for the rightmost subregion is decreased. In doing so, in the first region in the first image and in the second region in the second image, the parts of the body region that are not captured in both the images are less likely to be included in the overall histogram while the parts of the body region that are captured in both the images are more likely to be included in the overall histogram, which makes it more likely that the authentication is successfully completed. That is, in the weighting process performed by the generation unit 9 according to the first embodiment, it is possible to reduce the effect of the movement of the body region upon the color histogram caused by the parts of the body region hidden from the image capture unit 3 and the parts of the body region newly presented to the image capture unit 3.

In the first embodiment, the following advantageous effects are produced by setting the body region of the first user having a semi-elliptical shape. As illustrated in FIGS. 13A, 13B, 14A, and 14B, since the shape of the body region of an upper body of the first user is round, background regions might be undesirably included at upper-left and upper-right ends of a rectangular region if the body region having the rectangular region is set. In addition, if the rectangular region is set such that background regions are not included, the rectangular region becomes small relative to the actual body region, and therefore it becomes difficult to generate a color histogram based on a sufficient amount of information. In the first embodiment, by setting the body region of the first user having a semi-elliptical shape, the background is not likely to be included and most of the actual body region may be covered regardless of differences in the body type of the first user and the clothes the first user wears. In addition, for example, not by accurately determining the shape of the body region using the outline of the above-described changed pixel region but by determining the body region using the semi-elliptical region, color histograms may be extracted at high speed through a simple process.

Furthermore, as described above, when the direction of the body region of the first user changes, either the left or right end of the body region begins to hide from the image capture unit 3 and the other end of the body region is newly presented to the image capture unit 3. By setting the semi-elliptical region, the sizes of the subregions are smaller at the left and right ends, and accordingly the weighting values of these subregions for the overall color histogram are smaller than those of the subregions around the center of the semi-elliptical region. Therefore, the color histograms of the subregions around the center of the semi-elliptical region, which may be obtained even when the direction of the body region has changed, occupy most of the overall histogram, thereby producing an effect of making it more likely that the authentication is successfully completed.

The authentication unit 10 illustrated in FIG. 1 is, for example, a hardware circuit using a wired logic connection. Alternatively, the authentication unit 10 may be a function module realized by a computer program executed by the image processing device 1. The authentication unit 10 receives the corrected registration color histogram HR' and the authentication color histogram H from the generation unit 9, and performs continuous authentication of the first user on the basis of the corrected registration color histogram HR' and the authentication color histogram H.

For example, the authentication unit 10 calculates the similarity between the corrected registration color histogram HR' and the authentication color histogram H, and determines whether or not the similarity is equal to or larger than a color histogram authentication threshold, which serves as a certain threshold (Th). The certain threshold (Th) may be, for example, 90%. Now, a process for determining the similarity between the corrected registration color histogram HR' and the authentication color histogram H will be described. Various methods may be used to calculate the similarity between the color histograms, but, for example, a Bhattacharyya distance may be used. In order to calculate the similarity using the Bhattacharyya distance, for example, a calculation method disclosed in Kailath T. "The Divergence and Bhattacharyya Distance Measures in Signal Selection", IEEE Transactions on Communication Technology, 15 (1), pp. 52-60, 1967 may be used. In addition, for example, when normalized color histograms have been generated as illustrated in FIG. 12, similarity p may be calculated using the following expression if the normalized color histogram of the corrected registration color histogram HR' is denoted by pu and the normalized color histogram of the authentication color histogram H is denoted by qu.

$$\rho = \sum_{u=1} \sqrt{puqu} \qquad \text{(Expression 5)}$$

When the authentication unit 10 is to make a determination while combining the similarity between the color histograms of the head regions and the similarity between the color histograms of the body regions, for example, total similarity Stotal may be calculated using the following expression if the similarity between the color histograms of the head regions is denoted by Shead and the similarity between the color histograms of the body regions is denoted by Sbody.

$$Stotal = t \times Shead + (1-t) \times Sbody \qquad \text{(Expression 6)}$$

Here, t denotes a weighting coefficient for the similarity Shead between the color histograms of the head regions, and $0 \le t \le 1$.

If the calculated similarity between the color histograms is equal to or larger than the color histogram authentication threshold (Th), which serves as the certain threshold, the authentication unit 10 determines that the user is the first user, and if the calculated similarity is smaller than the color histogram authentication threshold (Th), the authentication unit 10 determines that the user is not similar to the first user (determines that the user is the second user).

FIG. 15 is a flowchart illustrating an authentication process performed by the continuous authentication apparatus 11. The authentication process illustrated in FIG. 15 is executed when the first user begins to use the continuous authentication apparatus 11 or the information device connected to (or incorporated into) the continuous authentication apparatus 11. First, the login authentication unit 2 performs the login authentication process (step S1501). As an authentication method used in the login authentication process, one of various known authentication methods (for example, password authentication, biometric authentication, card authentication, and the like) may be used. Next, the login authentication unit 2 determines whether or not it has been confirmed as a result of the login authentication process that the user is the first user, who is the authorized user (step S1502).

If the result of the login authentication performed the login authentication unit 2 is negative (NO in step S1502), the continuous authentication apparatus 11 ends the authentication process. Therefore, it is possible to avoid use of the continuous authentication apparatus 11 or the information device to which the continuous authentication apparatus 11 is connected by the second user, who is a user other than the first user, who is the authorized user. On the other hand, if the result of the login authentication performed by the login authentication unit 2 is positive (YES in step S1502), the login authentication unit 2 activates the image processing device 1, and the image processing device 1 performs the continuous authentication process (step S1503). A detailed procedure of the continuous authentication process performed in step S1503 will be described later.

If the result of the continuous authentication performed by the image processing device 1 is negative (NO in step S1504), whether or not the current time is within a grace period that begins from the initial continuous authentication is determined (step S1505). If the current time is not within the grace period (NO in step S1505), a process for locking the continuous authentication apparatus 11 or the information device connected to the continuous authentication apparatus 11 is performed (step S1507). Here, the locking process is, for example, a process for enabling the login authentication unit 2 to perform the login authentication process again by performing a temporary logout process. Alternatively, the locking process may be a process for causing the information device to be completely inoperative and issuing an alarm to an administrator and the like. The grace period may be, for example, 10 seconds.

On the other hand, if the result of the continuous authentication performed by the image processing device 1 is positive (YES in step S1504) or if the current time is within the grace period (YES in step S1505), the image processing device 1 waits for a certain period of time (step S1506), and executes the continuous authentication process (step S1503) again. The certain period of time in step S1506 may be arbitrarily set in consideration of robustness to be achieved by the continuous authentication apparatus 11 or the like. For example, the certain period of time may be set to 2 seconds or 5 seconds.

The user who has been confirmed to be the first user, who is the authorized user, as a result of the login authentication in the process illustrated in the flowchart of FIG. 15 may use the continuous authentication apparatus 11 or the information device connected to the continuous authentication apparatus 11 while the image processing device 1 is performing the continuous authentication process.

Figure 16:
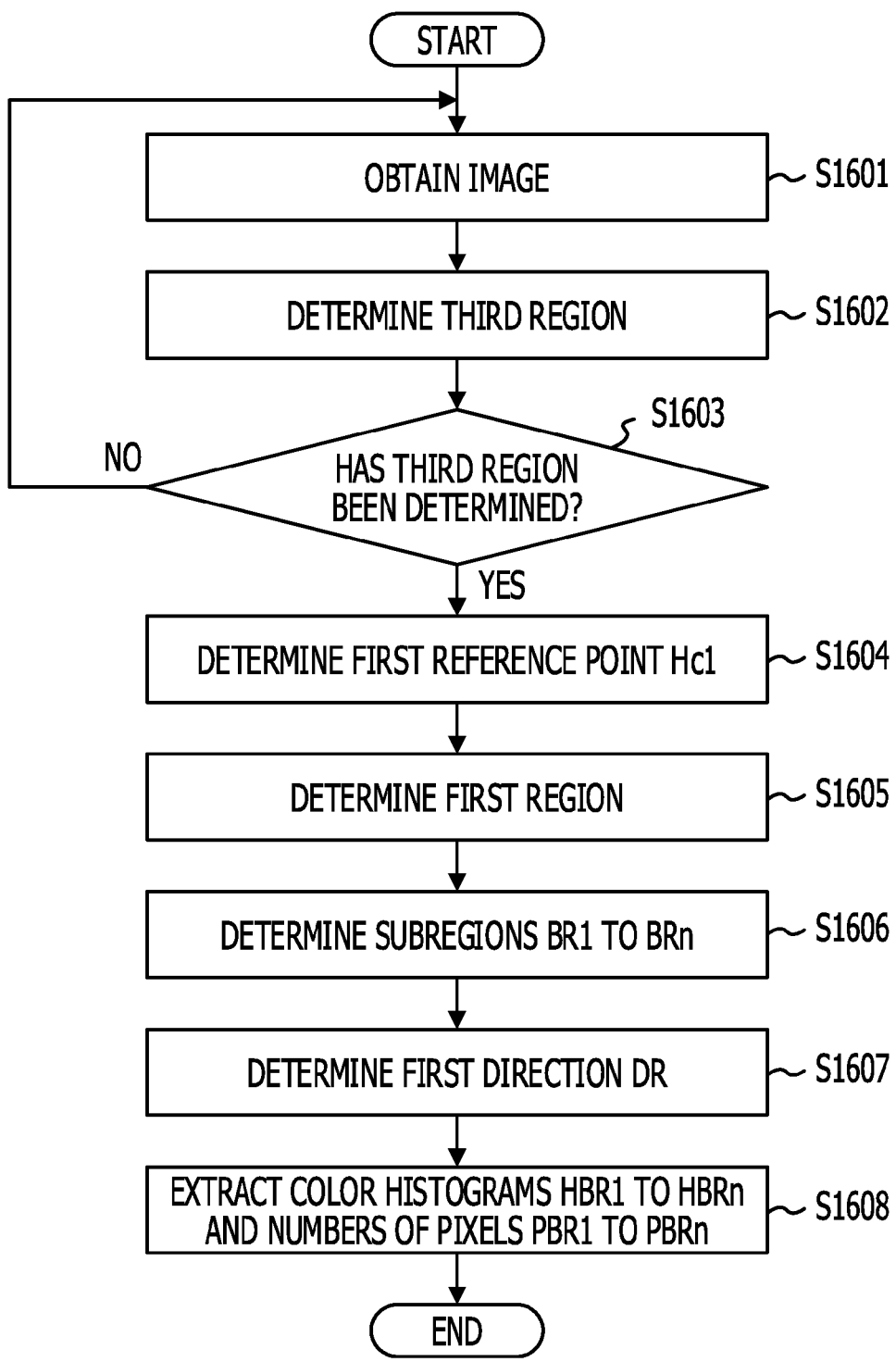
FIG. 16 is a flowchart illustrating an initial registration process performed by the image processing device.

Next, the detailed procedure of the continuous authentication process executed by the image processing device 1 in step S1503 of the authentication process illustrated in FIG. 15 will be described. FIG. 16 is a flowchart illustrating an initial registration process performed by the image processing device 1. In the continuous authentication process illustrated in FIG. 15 performed in step S1503, first, the initial registration process illustrated in FIG. 16 is executed.

First, the obtaining unit 6 obtains an image captured by the image capture unit 3, and determines the image as the first image (step S1601). Next, the determination unit 7 receives the first image from the obtaining unit 6, and determines the third region, which is the head region of the first user included in the first image (step S1602). The determination unit 7 determines whether or not the third region of the first user has been correctly determined (step S1603).

If the third region of the first user has not been correctly determined (NO in step S1603) because, for example, the third region of the first user is out of the image capture range of the image capture unit 3 during image capture by the image capture unit 3, the image capture unit 3 captures an image again, and the obtaining unit 6 obtains the image (step S1601). If the third region of the first user has not been correctly determined in step S1603 a certain number of times, the initial registration process may end and the locking process in step S1507 illustrated in FIG. 15 may be performed. On the other hand, in FIG. 16, if the third region has been correctly determined (YES in step S1603), the determination unit 7 determines the first reference point Hc1, which is the center coordinates of the third region (step S1604).

For example, the determination unit 7 determines the semi-elliptical region on the basis of the outline of a changed pixel region, and determines the semi-elliptical region as the first region, which is the body region of the first user (step S1605). Next, the determination unit 7 determines the subregions BR1 to BRn on the basis of the first region (step S1606). In step S1606, the determination unit 7 may determine n to be 5.

The determination unit 7 identifies one of the subregions BR1 to BRn that includes the X coordinate of the first reference point Hc1, and determines the first direction DR, which is the direction of the first region of the first user in the first image, on the basis of the identified subregion (step S1607).

The extraction unit 8 extracts the color histograms HBR1 to HBRn of the subregions BR1 to BRn, respectively, and the numbers of pixels PBR1 to PBRn included in the subregions BR1 to BRn, respectively (step S1608), and thus the initial registration process illustrated in FIG. 16 ends.

Figure 17:
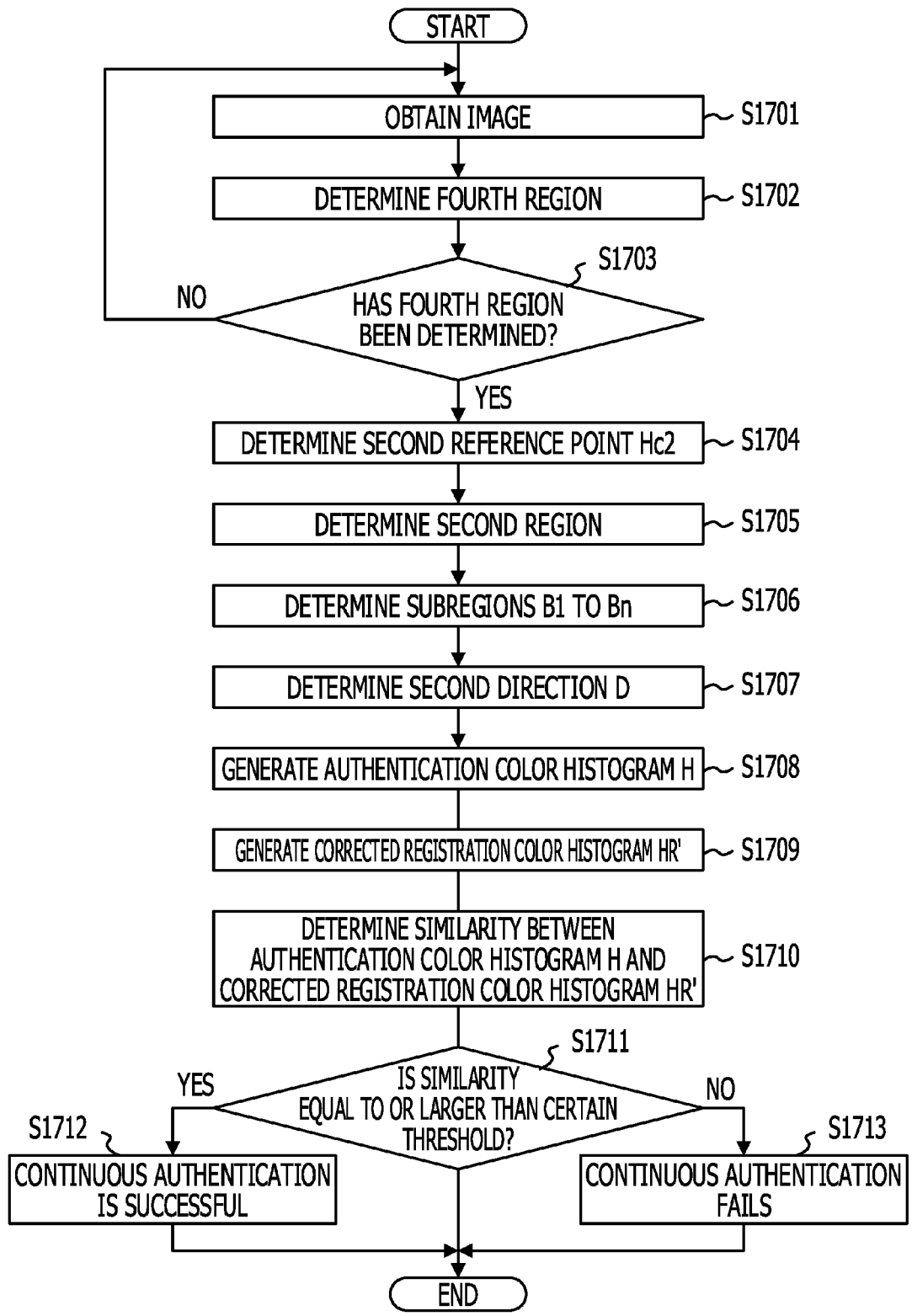
FIG. 17 is a flowchart illustrating a continuous authentication process performed by the image processing device.

FIG. 17 is a flowchart illustrating the continuous authentication process performed by the image processing device 1. The flowchart illustrates the detailed procedure of step S1503 illustrated in FIG. 15. It is to be noted that the processing flow illustrated in FIG. 16 is completed before the processing flow illustrated in FIG. 17 begins.

First, the obtaining unit 6 obtains an image captured by the image capture unit 3, and determines the image as the second image (step S1701). Next, the determination unit 7 receives the second image from the obtaining unit 6, and determines the fourth region, which is the head region of the first user in the second image (step S1702). The determination unit 7 determines whether or not the fourth region of the first user has been correctly determined (step S1703).

If the fourth region of the first user has not been correctly determined (NO in step S1703) because, for example, the fourth region of the first user is out of the image capture range of the image capture unit 3 during image capture by the image capture unit 3, the image capture unit 3 captures an image again, and the obtaining unit 6 obtains the image (step S1701). If the fourth region of the first user has not been correctly determined in step S1703 a certain number of times, the locking process in step S1507 illustrated in FIG. 15 may be performed. On the other hand, in FIG. 17, if the fourth region has been correctly determined (YES in step S1703), the determination unit 7 determines the second reference point Hc2, which is the center coordinates of the fourth region (step S1704).

For example, the determination unit 7 determines the semi-elliptical region on the basis of the outline of a changed pixel region, and determines the semi-elliptical region as the second region, which is the body region of the first user (step S1705). Next, the determination unit 7 determines the subregions B1 to Bn on the basis of the second region (step S1706). In step S1706, the determination unit 7 may determine n to be 5.

The determination unit 7 identifies one of the subregions B1 to Bn that includes the X coordinate of the second reference point Hc2, and determines the second direction D, which is the direction of the second region of the first user in the second image, on the basis of the identified subregion (step S1707).

The generation unit 9 generates the authentication color histogram H using, for example, Expression 4 (step S1708). Next, the generation unit 9 generates the corrected registration color histogram HR' using, for example, Expression 3 (step S1709). The authentication unit 10 determines the similarity between the authentication color histogram H and the corrected registration color histogram HR' (step S1710). In step S1710, the authentication unit 10 may make a determination while combining the similarity between the color histograms of the head regions and the similarity between the color histograms of the body regions, instead. Alternatively, the authentication unit 10 may perform the continuous authentication using only the similarity between the color histograms of the head regions after the processing in step S1705.

The authentication unit 10 executes the continuous authentication process by determining that the user is the first user (continuous authentication is successful) (step S1712) if the similarity between the color histograms is equal to or larger than the color histogram authentication threshold (Th), which is the certain threshold (YES in step S1711), and that the user is the second user (continuous authentication fails) (step S1713) if the similarity between the color histograms is smaller than the authentication threshold (NO in step S1711).

Second Embodiment

Figure 18:
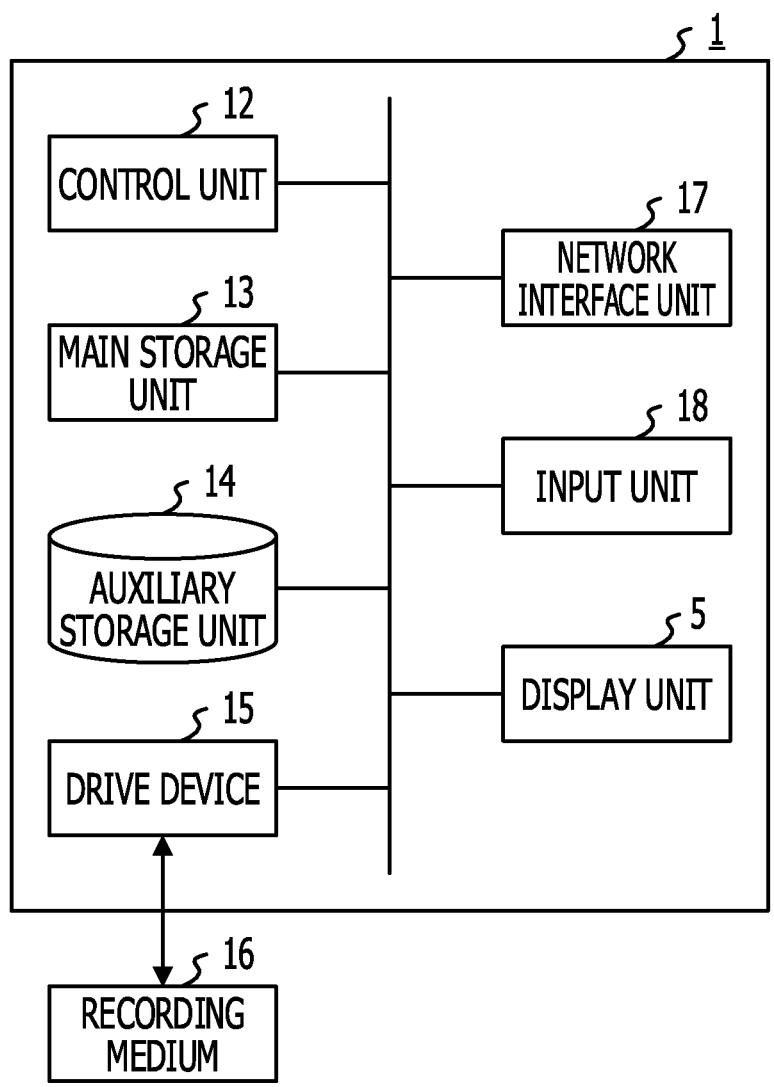
FIG. 18 is a diagram illustrating the hardware configuration of a computer that functions as the image processing device according to an embodiment.

FIG. 18 is a diagram illustrating the hardware configuration of a computer that functions as the image processing device 1 according to an embodiment. As illustrated in FIG. 18, the image processing device 1 includes a control unit 12, a main storage unit 13, an auxiliary storage unit 14, a drive device 15, a network interface unit 17, an input unit 18, and a display unit 5. These components are connected to one another through a bus in such a way as to enable transmission and reception of data.

The control unit 12 is a central processing unit (CPU) that controls each component and that calculates and processes data in the computer. The control unit 12 is an arithmetic device that executes programs stored in the main storage unit 13 and the auxiliary storage unit 14, and receives data from the input unit 18 or a storage device, calculates and processes the data, and outputs the data to the display unit 5 or the storage device.

The main storage unit 13 is a ROM, a RAM, or the like, and is a storage device that stores or temporarily saves programs and data such as an operating system (OS), which is basic software executed by the control unit 12, and application software.

The auxiliary storage unit 14 is an HDD or the like, and is a storage device that stores data relating to the application software.

The drive device 15 reads a program from a recording medium 16, that is, for example, a flexible disk, and installs the program in the auxiliary storage unit 14.

In addition, the storage medium 16 stores a certain program in the recording medium 16, and the certain program stored in the recording medium 16 is installed in the image processing device 1 through the drive device 15. The installed certain program may be executed by the image processing device 1.

The network interface unit 17 is an interface between a peripheral device having a communication function connected through a network such as a local area network (LAN) or a wide area network (WAN) constructed by a data transmission path such as a wired and/or wireless line and the image processing device 1.

The input unit 18 includes a keyboard including cursor keys, numeric input keys, and various function keys and a mouse, a slide pad, or the like for selecting a key in a screen displayed on the display unit 5. The input unit 18 is a user interface for enabling the user to provide an operation instruction for the control unit 12 and input data.

The display unit 5 is configured by a cathode ray tube (CRT), a liquid crystal display (LCD), or the like, and displays data in accordance with display data input from the control unit 12.

The above described method for processing an image may be realized as a program to be executed by a computer. By installing the program from a server or the like and causing the computer to execute the program, the above-described method for processing an image may be realized.

In addition, the above-described image processing may be realized by recording the program on the recording medium 16 and causing a computer or a mobile terminal to read the recording medium 16 on which the program is recorded. The recording medium 16 may be one of various types of recording media including recording media on which information is optically, electrically, or magnetically recorded such as a compact-disc read-only memory (CD-ROM), a flexible disk, and magneto-optical disk and semiconductor memories on which information is electrically recorded such as a ROM and a flash memory.

The illustrated components of each device do not have to be physically configured as illustrated. That is, a specific mode of distributing and integrating each device is not limited to those illustrated, and the entirety or part of each device may be functionally or physically distributed or integrated in an arbitrary unit in accordance with various loads and use conditions. Various processes described in the above embodiments may be realized by executing prepared programs using a computer such as a PC or a work station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a processor; and
a memory which stores a plurality of instructions, which when executed by the processor, cause the processor to execute:
obtaining a first image and a second image;
determining a first direction on basis of a relative position between a center of a first head region and a center of a first body region of a user included in the first image and a second direction on basis of a relative position between a center of a second head region and a center of a second body region of the user included in the second image;
extracting a first feature quantity from the first body region and a second feature quantity from the second body region;
generating a third feature quantity from the first feature quantity or a fourth feature quantity from the second feature quantity on basis of the first direction and the second direction; and
authenticating the user on basis of similarity between the first feature quantity or the third feature quantity and the second feature quantity or the fourth feature quantity.

2. The device according to claim 1,
wherein, in the generating, the third feature quantity is generated from the first feature quantity and the fourth feature quantity is generated from the second feature quantity on basis of a weighting value in accordance with a ratio between the first body region and the second body region.

3. The device according to claim 1,
wherein, in the generating, a common region between the first body region and the second body region is calculated on basis of a difference between the first direction and the second direction, and the third feature quantity or the fourth feature quantity is generated on basis of the common region.

4. The device according to claim 1,
wherein, in the determining, certain subregions are determined by dividing the first body region or the second body region into the certain subregions, and
wherein, in the generating, feature quantities included in the subregions are controlled in accordance with a difference between the first direction and the second direction.

5. A method for processing an image, the method comprising:
obtaining a first image and a second image;
determining, by a computer processor, a first direction on basis of a relative position between a center of a first head region and a center of a first body region of a user included in the first image and a second direction on basis of a relative position between a center of a second head region and a center of a second body region of the user included in the second image;
extracting a first feature quantity from the first body region and a second feature quantity from the second body region;
generating a third feature quantity from the first feature quantity or a fourth feature quantity from the second feature quantity on basis of the first direction and the second direction; and
authenticating the user on the basis of similarity between the first feature quantity or the third feature quantity and the second feature quantity or the fourth feature quantity.

6. The method according to claim 5,
wherein, in the generating, the third feature quantity is generated from the first feature quantity and the fourth feature quantity is generated from the second feature quantity on basis of a weighting value in accordance with a ratio between the first body region and the second body region.

7. The method according to claim 5,
wherein, in the generating, a common region between the first body region and the second body region is calculated on basis of a difference between the first direction and the second direction, and the third feature quantity or the fourth feature quantity is generated on the basis of the common region.

8. The method according to claim 5,
wherein, in the determining, certain subregions are determined by dividing the first body region or the second body region into the certain subregions, and
wherein, in the generating, feature quantities included in the subregions are controlled in accordance with a difference between the first direction and the second direction.

9. A non-transitory computer-readable storage medium storing an image processing program for causing a computer to execute a process comprising:
obtaining a first image and a second image;
determining a first direction on basis of a relative position between a center of a first head region and a center of a first body region of a user included in the first image and a second direction on basis of a relative position between a center of a second head region and a center of a second body region of the user included in the second image;
extracting a first feature quantity from the first body region and a second feature quantity from the second body region;
generating a third feature quantity from the first feature quantity or a fourth feature quantity from the second feature quantity on basis of the first direction and the second direction; and
authenticating the user on basis of similarity between the first feature quantity or the third feature quantity and the second feature quantity or the fourth feature quantity.

* * * * *